July 20, 1937.  L. BÉCHEREAU ET AL  2,087,426
HYDRAULIC SHOCK ABSORBER AND SIMILAR APPARATUS
Filed April 26, 1935
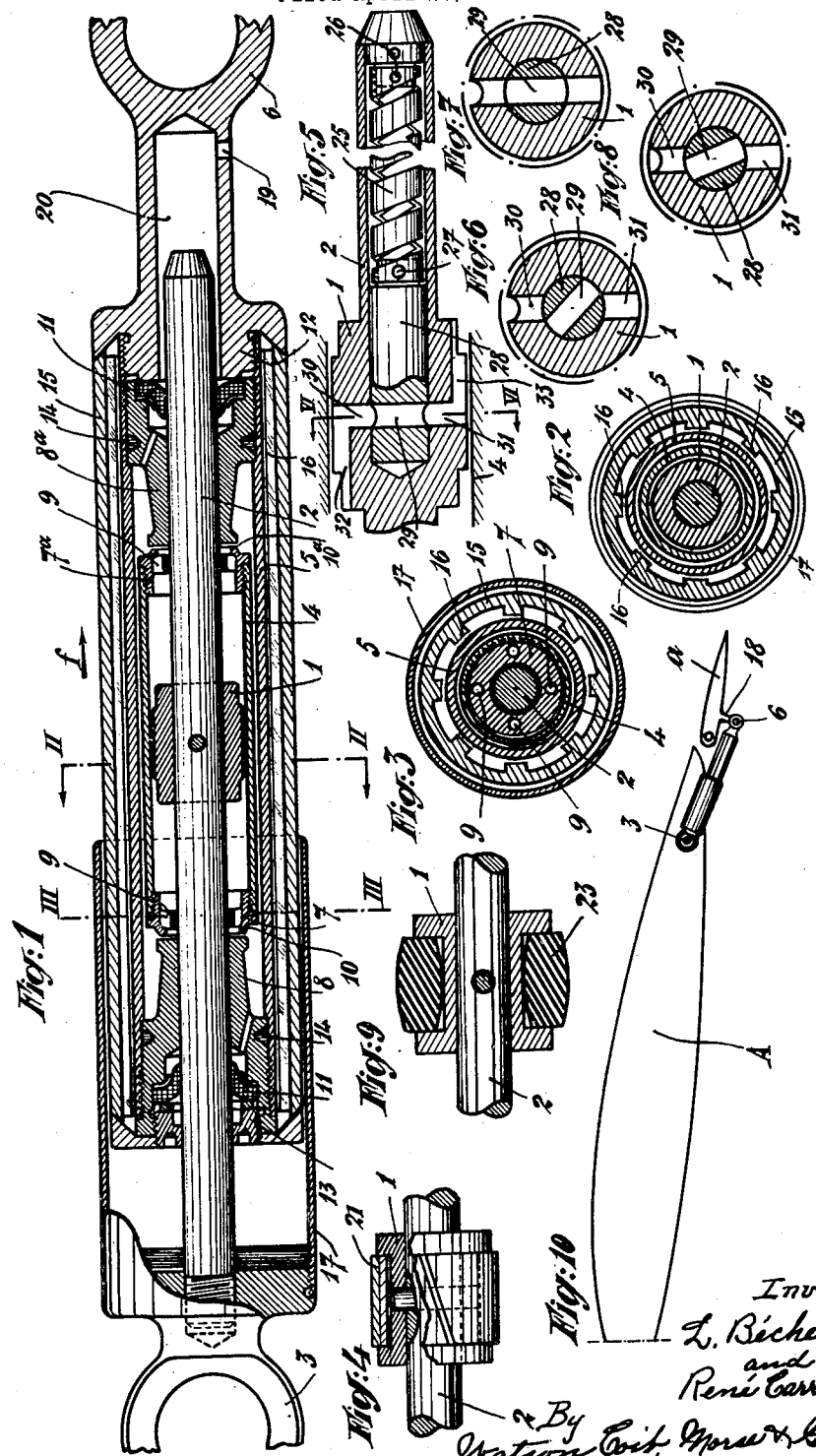

Patented July 20, 1937

2,087,426

UNITED STATES PATENT OFFICE 2,087,426

HYDRAULIC SHOCK ABSORBER AND SIMILAR APPARATUS

Louis Béchereau and René Carrouée, Paris, France

Application April 26, 1935, Serial No. 18,470
In France January 30, 1935

7 Claims. (Cl. 188—96)

The present invention concerns improvements in hydraulic self-resisting apparatus, of the rectilinear type, including a cylinder, a piston and a reservoir, adapted to be employed in connection with mechanisms in which the parts are given reciprocating motions, such as brakes, coupling devices, shock-absorbers, anti-vibratory devices, etc.

The invention is more especially concerned with the apparatus of this kind that are to be employed for preventing beats or vibrations in some control gears, such as the steering gear of a vehicle or the gear for controlling the position of an aileron or similar part of an airplane.

The object of the present invention is to provide apparatus of the kind above mentioned which are stronger and more reliable than similar apparatus employed up to now, occupy but little room, and are capable of working satisfactorily under different conditions of temperature.

In a more specific manner, an important object of the present invention is to provide an apparatus of the kind above mentioned in which the exchanges of liquid between the various compartments are reduced to a minimum, which, on the one hand, facilitates distribution, and, on the other hand, makes it possible to reduce, and even to nearly wholly eliminate, the volume of the air cushion which is generally provided in apparatus of this kind for the displacement of the rod, whereby the space occupied by the apparatus is thus further reduced.

The essential feature of the apparatus according to the present invention lies in the fact that the piston rod extends on either side of the brake cylinder and of the reservoir, when the latter is disposed concentrically with respect to the cylinder, in such manner that the displacement of the rod proper does not produce any variation of volume inside the apparatus, said rod extending through the ends of the reservoir through apertures provided with suitable packing means.

The distribution of the liquid inside the brake cylinder is ensured either through valves of the usual type, or preferably through the clearance of the brake cylinder itself, provided with suitable apertures at both ends and adapted to move along the piston rod, between two stops suitably spaced apart and arranged to alternately close said apertures of the cylinder.

Furthermore, according to another feature of the invention, the apparatus may be provided with a thermostatic correcting device adapted to compensate for the variations of viscosity of oil, or with a sleeve for avoiding the loss of heat. Both of these means may be combined together when the apparatus is to work within a very wide range of temperatures (case of apparatus intended to be fitted on airplanes). Other features of the present invention will result from the following detailed description of some specific embodiments thereof.

Preferred embodiments of the present invention will be hereinafter described, with reference to the accompanying drawing, given merely by way of example, and in which:

Fig. 1 is a longitudinal sectional view of a shock absorber according to the present invention;

Figs. 2 and 3 are transverse sectional views on the lines II—II and III—III of Fig. 1;

Figs. 4 and 5 show, partly in section, two different embodiments of thermostatic correcting devices intended to compensate for the variations of viscosity of the liquid;

Figs. 6, 7 and 8 are sectional views, on the line VI—VI of Fig. 5 corresponding to three different respective positions of the parts of the device of Fig. 5;

Fig. 9 shows a modification of the device for compensating for variations in the viscosity of oil;

Fig. 10 diagrammatically shows the arrangement of the apparatus according to the present invention between an airplane wing and its aileron.

In the embodiment shown in Fig. 1, the apparatus includes a piston 1 carried by a rod 2 which may be secured, through a joint 3, with one of the parts the relative oscillations of which are to be braked. Piston 1 moves inside a cylinder 4 mounted in a sleeve 5, which may be jointed at 6 with the other part. A certain interval is left between the outer face of said piston and the inner wall of said cylinder, the width of said interval ranging from 0.15 mm. to 0.25 mm. (that is to say, substantially five times greater than the usual play existing in ordinary shock absorbers between the corresponding parts). It is pointed out that, with such an arrangement, the section of the interval provided between the cylindrical outer wall of piston 1 and the inner face of cylinder 4 remains uniform during the working of the apparatus, and is therefore uninfluenced by the variations of pressure on the respective sides of said piston, whereas, in prior systems, this section, which was that uncovered by spring loaded valves, depended upon the value of the difference of pressures on these respective sides, Cylinder 4 is kept in proper axial position, by means of rings 7, 7ª, screwed at either end thereof, respectively, with respect to piston rod 2. Said cylinder 4 is movable inside sleeve 5, along the piston rod, between stops 8, 8ª screwed in said sleeve. Each of these rings 7, 7ª is provided with holes 9 which connect the inside of cylinder 4 with the inside of sleeve 5 constituting the reserve of liquid. The whole of the sleeve and the cylinder is previously filled with oil in such manner that at least holes 9 are under the liquid level, without air pockets.

If, under the effect of a relative movement of the two parts between which the apparatus is mounted, piston 1 tends to move, for instance in the direction of arrow f, the liquid driven by said piston toward ring 7ª causes cylinder 4 to move in the same direction, so that an edge 10ª, carried by ring 7ª, is applied against stop 8ª, which stops the passage of liquid through said ring. The liquid driven by the piston is now compelled to flow through the space corresponding to the play existing between piston 1 and cylinder 4. The retarding action thus produced depends, as it will be readily understood, upon the importance of this play. At the same time, edge 10 is moved away from stop 8 and permits the passage of liquid that may be sucked in into the cylinder so as to compensate for leakage.

For a displacement of piston 1 in the opposite direction, the action would be the same, ring 7 being then applied against stop 8, while ring 7ª is moved away from stop 8ª. The apparatus therefore acts in the same manner in opposite directions.

We provide packing members 11 around piston rod 2 between each of the stops 8, 8ª and parts 12 and 13 rigid with sleeve 5, respectively. Packing members might also be provided at 14 between parts 8, 8ª and sleeve 5, respectively. 19 is a hole connecting chamber 20 with the atmosphere. Fixation member 3 is rigid with a cap 17 surrounding the end of sleeve 5 and of envelope 15.

When the apparatus is intended to work in a medium the temperature of which may vary within wide limits, it is advantageous to combine with said apparatus a thermostatic correcting device compensating for the variations of viscosity of oil.

This correcting device may for instance include an expansible ring or segment 21 fitted in a groove of piston 1, so that the play between said element 21 and the cylinder varies in accordance with the temperature. This embodiment is shown by Fig. 4. This part 21 is made, for instance, of a metal having a coefficient of expansion higher than that of either piston 1 or cylinder 4. For instance part 21 is made of a bi-metallic strip (one part of ferronickel and the other of ferronickel of different composition, and therefore different coefficient of expansion, or the inner part of ferronickel and the outer part of brass) bent into the shape of a ring as shown by the drawing.

In the embodiment shown by Fig. 5, the correcting device includes a bi-metallic blade or ribbon 25 wound helically inside the hollow rod of piston 1, which piston is, in this case, integral with rod 2. This ribbon 25 is fixed, at one of its ends 26, to the hollow rod, and, at the opposite end 27, to a small solid cylinder 28, adapted to turn about its own axis in a suitable bore provided in piston 1. This cylindrical member 28 is provided with a small conduit 29 extending transversely throughout it, so that, when said cylindrical member 28 is caused to turn about its own axis, said conduit 29 may connect together two holes 30 and 31 provided in the piston and prolonged by longitudinal grooves 32, 33 opening into opposite faces of said piston, respectively. This cylindrical member 28, with its conduit 29, forms a kind of throttle valve between holes 30 and 31. The whole of this bi-metallic ribbon 25 and cylindrical member 28 is adjusted in such manner that, when the temperature is high and therefore the viscosity of oil is low, the expansion of ribbon 25 brings cylindrical member 28 in the position shown by Fig. 6. The communication between holes 30 and 31 is thus cut off and, in the course of the displacement of piston 1, the only passage for the liquid is the play existing between piston 1 and cylinder 4. If, now, the temperature drops, ribbon 25 contracts and causes cylindrical member 28 to turn so as to more or less open the communication between groove 32, hole 30, on the one hand, and hole 31 and groove 33, on the other hand. The liquid driven by the piston is then allowed to flow, not only through the space corresponding to the play between the piston and the cylinder, but also through by-pass conduit 29, which compensates for the increase in the viscosity of oil. For the minimum temperatures at which the apparatus is to work, conduit 29 is brought into coaxial relation with holes 30 and 31 and the section of flow through this by-pass conduit is maximum.

Another device (Fig. 9) for the same purpose includes a ring or piston the periphery of which consists of an elastic material, such as rubber, which yields more or less according to the viscosity of oil.

The correcting device to be included in our apparatus is not limited to the embodiments that have just been described.

We may also protect the apparatus, as far as this is possible, against variations of the temperature of the surrounding medium, for instance by surrounding said apparatus with a heat-insulating envelope 15 made of a suitable material, disposed at a certain distance from sleeve 5, so as to leave an annular interval which further increases thermal insulation. This envelope may be provided with inner ribs 16 (Fig. 2) which give it the necessary rigidity.

Of course, a thermal correction device as above described and this heat insulating envelope 15 may be associated in the apparatus, so as to obtain the best possible results.

Fig. 10 shows, diagrammatically and merely by way of example, the arrangement of an apparatus according to the present invention between an airplane wing A and an aileron a, one of the parts of the apparatus being secured, at 3, to the wing, and the other part being connected to the aileron through a suitable articulation.

In a general way, while we have, in the above description, what we deem to be practical and efficient embodiments of the present invention, it should be well understood that we do not wish to be limited thereto as there might be changes made in the arrangement, disposition and form of the parts without departing from the principle of the present invention as comprehended within the scope of the accompanying claims.

What we claim is:

1. An apparatus for damping relative displacements of two parts with respect to each other, which comprises, in combination, a cylinder filled with liquid, means for connecting said cylinder with one of said parts, a piston movable in said cylinder with a certain interval between the cylindrical outer wall of said piston and the inner face of said cylinder uninfluenced by pressure variations on the respective sides of said piston, means, including a rod rigid with said piston, for connecting said piston with the other of these two parts, a casing also filled with liquid, means at both ends of said cylinder, operative by movements of said piston in said cylinder, for closing the end of said cylinder toward which said piston is moving and placing the opposite end of said cylinder in communication with said casing, said rod extending throughout said cylinder and said casing with a fluid-tight connection between said piston rod and said casing so that the movements of said rod do not produce any variation of volume inside said cylinder and said casing.

2. An apparatus for damping relative displacements of two parts with respect to each other, which comprises, in combination, a casing filled with liquid, a cylinder also filled with liquid movable axially inside said casing, a piston movable in said cylinder with a certain play, rings provided with holes carried by the respective ends of said cylinder, stops provided at both ends respectively of said casing so as to limit the axial movements of said cylinder inside said casing, an edge carried by each of said rings adapted to cooperate with the corresponding stop for cutting off the communication between said cylinder and said casing through the holes above mentioned when said edge is applied against said stop, means for connecting said casing with one of the two first mentioned parts, means including a rod rigid with said piston for connecting said piston with the other of these two parts, said rod extending throughout said piston, said rings, said stops and the ends of said casing, and packing means provided at the ends of said casing for preventing liquid to leak out past said rod.

3. An apparatus according to claim 2 further including a sleeve surrounding said casing and adapted to prevent exchange of heat between said casing and the medium on the outside of said sleeve.

4. An apparatus according to claim 2 further including a by-pass conduit extending throughout said piston, means for controlling the section of flow through said by-pass conduit and means operative by variations of the temperature inside said cylinder for actuating said control means.

5. An apparatus according to claim 2 further including a by-pass conduit extending throughout said piston, a valve element rotatable in said piston for controlling the section of flow through said by-pass conduit, and a bi-metallic blade helically wound inside said rod for controlling the position of said valve element in accordance with the temperature of the liquid in said casing.

6. An apparatus for damping relative displacements of two parts with respect to each other, which comprises, in combination, a cylinder and piston system filled with a liquid, forming at least two chambers and a passage of restricted section, uninfluenced by pressure variations in said chambers, connecting these chambers together, and means, operative by relative displacements of these two parts, including a rod operatively connected to one of these two parts, for varying the relative volumes of these two chambers so that said liquid is compelled to flow through said passage, whereby relative displacements of these two parts are braked by the flow of liquid through said passage, said rod extending throughout said cylinder so that the movements of said rod with respect to said system do not produce any variation of volume inside said system, and means, responsive to variations of temperature provided on the periphery of said piston, for varying the section of flow through said passage in accordance with variations of the temperature of the liquid.

7. An apparatus for damping relative displacements of two parts with respect to each other, which comprises, in combination, a cylinder filled with liquid, means for mechanically connecting said cylinder with one of said parts, a piston movable in said cylinder, with an interval of play between these two last mentioned elements, means, including a rod rigid with said piston, for mechanically connecting said piston with the other of these two parts, a casing also filled with liquid, means at both ends of said cylinder, operative by movements of said piston in said cylinder, for closing the end of said cylinder toward which said piston is moving and placing the opposite end of said cylinder in communication with said casing, said rod extending throughout said cylinder and said casing with a fluid-tight connection between said piston rod and said casing, so that the movements of said rod do not produce any variation of the volume inside said cylinder and said casing, and an annular element made of a yielding material forming the periphery of said piston, so as to vary said play in accordance with the viscosity of the liquid in said cylinder.

LOUIS BÉCHEREAU.
RENÉ CARROUÉE.